(12) United States Patent
Hisamura et al.

(10) Patent No.: US 11,587,733 B2
(45) Date of Patent: Feb. 21, 2023

(54) CAPACITOR

(71) Applicant: Panasonic Intellectual Property Management Co., Ltd., Osaka (JP)

(72) Inventors: Hirotaka Hisamura, Toyama (JP); Hideki Katayama, Toyama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/549,951

(22) Filed: Dec. 14, 2021

(65) Prior Publication Data
US 2022/0102073 A1 Mar. 31, 2022

Related U.S. Application Data

(63) Continuation of application No. PCT/JP2020/026109, filed on Jul. 3, 2020.

(30) Foreign Application Priority Data

Jul. 23, 2019 (JP) .............................. JP2019-135052

(51) Int. Cl.
*H01G 4/224* (2006.01)
*H01G 2/08* (2006.01)
*H01G 2/10* (2006.01)
H01G 4/38 (2006.01)
H01G 9/08 (2006.01)
H01G 11/78 (2013.01)

(52) U.S. Cl.
CPC ............... *H01G 4/224* (2013.01); *H01G 2/08* (2013.01); *H01G 2/10* (2013.01); H01G 4/38 (2013.01); H01G 9/08 (2013.01); H01G 11/78 (2013.01)

(58) Field of Classification Search
CPC ............ H01G 4/224; H01G 2/08; H01G 2/10; H01G 4/38; H01G 9/08; H01G 11/78
See application file for complete search history.

(56) References Cited

U.S. PATENT DOCUMENTS

| 2018/0233285 A1* | 8/2018 | Sato ........................ H01G 4/18 |
| 2021/0043377 A1* | 2/2021 | Maeno .................. H01G 2/106 |
| 2022/0102073 A1* | 3/2022 | Hisamura ................ H01G 2/08 |

FOREIGN PATENT DOCUMENTS

| CN | 104103417 A | * | 10/2014 | ............... G01K 1/14 |
| CN | 104521125 A | * | 4/2015 | ........... H01L 23/051 |
| CN | 107294312 B | * | 5/2019 | |

(Continued)

OTHER PUBLICATIONS

International Search Report of PCT application No. PCT/JP2020/026109 dated Sep. 29, 2020.

*Primary Examiner* — Dion R. Ferguson
(74) *Attorney, Agent, or Firm* — McDermott Will & Emery LLP

(57) ABSTRACT

A capacitor includes a capacitor element, a case that houses the capacitor element and contains a resin, a metal plate insert molded in the case, and a filler resin filled in the case. The metal plate includes a main plate portion and a covered portion disposed along a perimeter of the main plate portion. The main plate portion has an outer surface exposed outwardly from an opening of the case. The covered portion has an outer surface covered by a peripheral portion of the case, the peripheral portion being disposed around the opening.

8 Claims, 9 Drawing Sheets

(56) References Cited

FOREIGN PATENT DOCUMENTS

| | | | | | |
|---|---|---|---|---|---|
| CN | 210720546 | U | * | 6/2020 | ............ G01R 15/146 |
| CN | 111403174 | A | * | 7/2020 | |
| DE | 102018203362 | A1 | * | 9/2019 | ............... H01G 2/08 |
| JP | 2008130641 | A | * | 6/2008 | ............. H01G 4/224 |
| JP | 2009188158 | A | * | 8/2009 | |
| JP | 4946618 | B2 | * | 6/2012 | ............. H01G 4/224 |
| JP | 2012-199350 | | | 10/2012 | |
| KR | 20170034956 | A | * | 3/2017 | |
| WO | WO-2022054729 | A1 | * | 3/2022 | |

* cited by examiner

CAPACITOR

BACKGROUND

1. Technical Field

The present disclosure relates to a capacitor.

2. Description of the Related Art

A conventionally known case-molded capacitor includes a resin-made case that houses a capacitor element and is filled with a filler resin, thus having improved impact resistance and improved moisture resistance. Heat generated by the capacitor element in such a capacitor is not easily dissipated out of the case.

In order to improve heat dissipation from the case, a metal plate may be insert molded in a side face part or a bottom face part of the case so that its outer surface is exposed to outside. A capacitor having such a configuration is described, for example, in Unexamined Japanese Patent Publication No. 2012-199350.

The case-molded capacitor described in Unexamined Japanese Patent Publication No. 2012-199350 has a resin-made case including an insert molded metal plate at an outer bottom surface. This metal plate has a plurality of projections at an upper surface. The case has recesses in an inner bottom surface. Inside the recess, an upper face of the projection of the metal plate is exposed and is adhered to a mold resin filled in the case.

SUMMARY

A capacitor according to a main aspect of the present disclosure includes a capacitor element, a case that houses the capacitor element and contains a resin, a metal plate insert molded in the case, and a filler resin filled in the case. The metal plate includes a main plate portion and a covered portion disposed along a perimeter of the main plate portion. The main plate portion has an outer surface exposed outwardly from an opening of the case. The covered portion has an outer surface covered by a peripheral portion of the case, the peripheral portion being disposed around the opening.

The present disclosure can provide the capacitor in which the metal plate insert molded in the case does not easily separate outward from the case.

DETAILED DESCRIPTION OF EMBODIMENT

Figure 1:
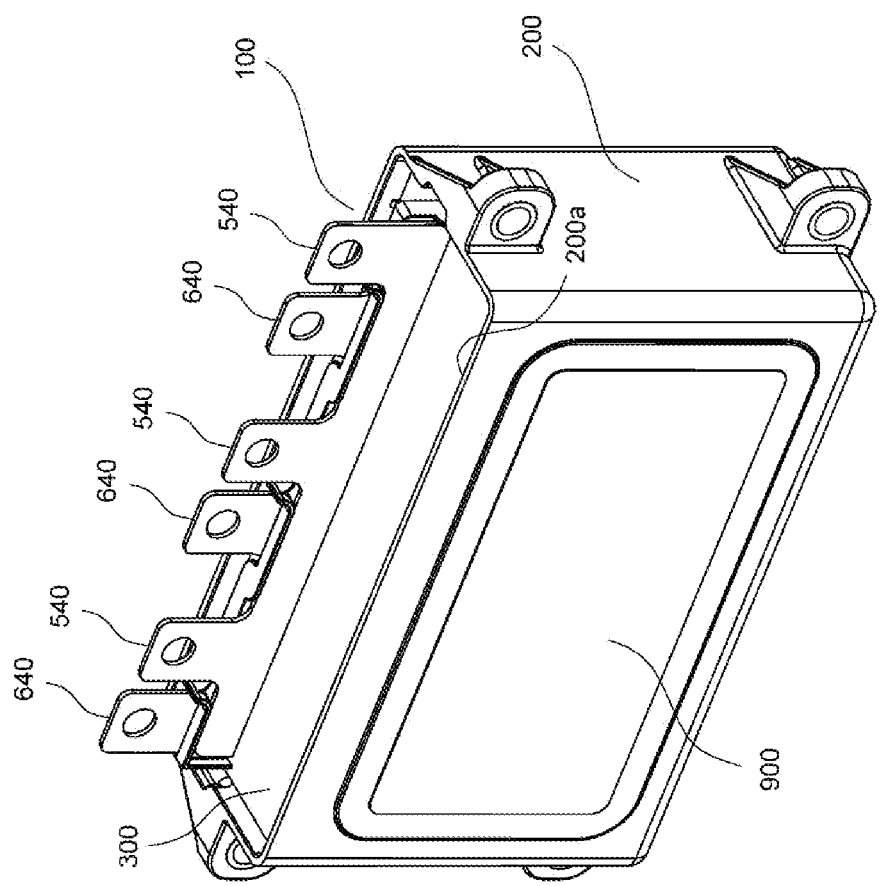
FIG. 1 is a perspective view illustrating a film capacitor according to an exemplary embodiment.

It is desirable that the capacitor described in Unexamined Japanese Patent Publication No. 2012-199350 should prevent the metal plate from separating outward from the case even when separation at interface between the metal plate and the case or interface between the metal plate and the mold resin due to differential coefficients of linear expansion thereof as a result of the capacitor's exposure to a temperature change (which causes thermal shock or the like).

The present disclosure provide a capacitor in which the metal plate does not easily separate outward from the case in the configuration having the metal plate insert molded in a case.

The effect or significance of the present disclosure will be more apparent from an exemplary embodiment described below. However, the following exemplary embodiment is only illustrative of the present disclosure and thus is not at all restrictive of the present disclosure.

With reference to the drawings, film capacitor 1, which is one aspect of a capacitor according to the present disclosure, is described hereinafter. For convenience, some of the drawings show which way is front, which way is rear, which way is left, which way is right, which way is up, and which way is down. It is to be noted that these directions in the drawings merely indicate relative orientations of film capacitor 1 and not absolute orientations. For convenience of explanation, a configuration includes some constituent elements that are each named based on the direction in the drawings, such as "a bottom face part" and "a front face part".

In the present exemplary embodiment, film capacitor 1 corresponds to "a capacitor" in the claims. Elongated projection 210 corresponds to "a projection" in the claims. First end-face electrode 410 corresponds to "an electrode" in the claims. Flat spring 660 corresponds to "a pressing portion" in the claims. Rear surface 901 of metal plate 900 corresponds to "an inner surface of a metal plate" in the claims. Front surface 911 of main plate portion 910 corresponds to "an outer surface of a main plate portion" in the claims. Front surface 921 of covered portion 920 corresponds to "an outer surface of a covered portion" in the claims.

The above descriptions are intended only for associating a configuration in the claims with the configuration of the exemplary embodiment. The association does not at all limit the disclosure in the claims to the configuration of the exemplary embodiment.

FIG. 1 is a perspective view illustrating film capacitor 1.

Film capacitor 1 includes capacitor element unit 100, case 200 housing capacitor element unit 100, and filler resin 300 filled in case 200.

Filler resin 300 is a thermosetting resin such as an epoxy resin. Filler resin 300 is injected in a liquid phase into case 200, which houses capacitor element unit 100, and is then cured by being heated inside case 200. A most part of capacitor element unit 100 is embedded in filler resin 300, and thus is protected from moisture and impact.

Three first connection terminals 540 and three second connection terminals 640 of capacitor element unit 100 lead out of case 200 through opening 200a at a top of case 200. First connection terminals 540 and second connection terminals 640 are alternatively arranged in left-right direction so that first connection terminal 540 and second connection terminal 640 are adjacent to each other.

Figure 2:
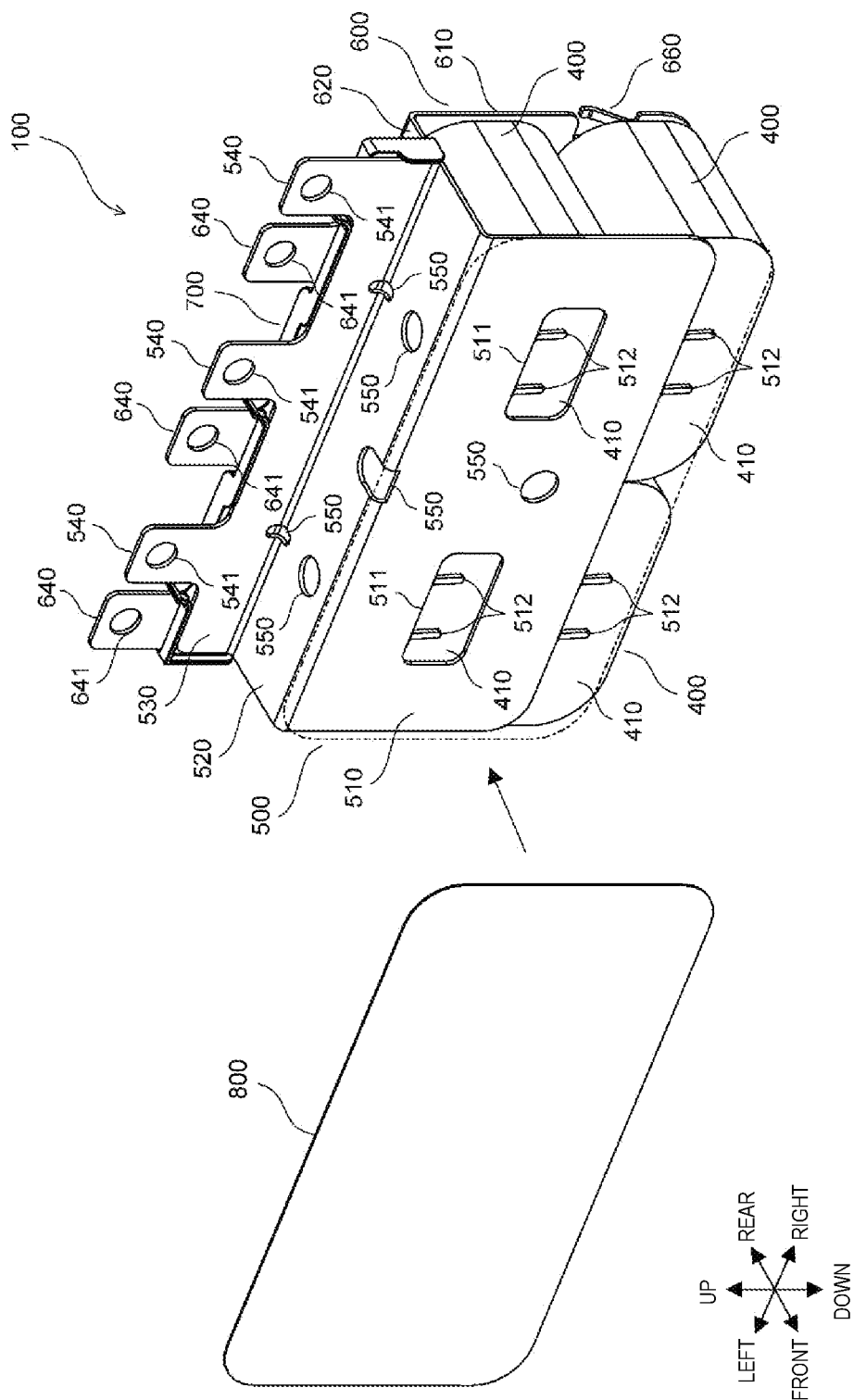
FIG. 2 is a perspective view illustrating a capacitor element unit according to the exemplary embodiment as viewed from in front and above, also illustrating an insulating sheet to be attached.
Figure 3:
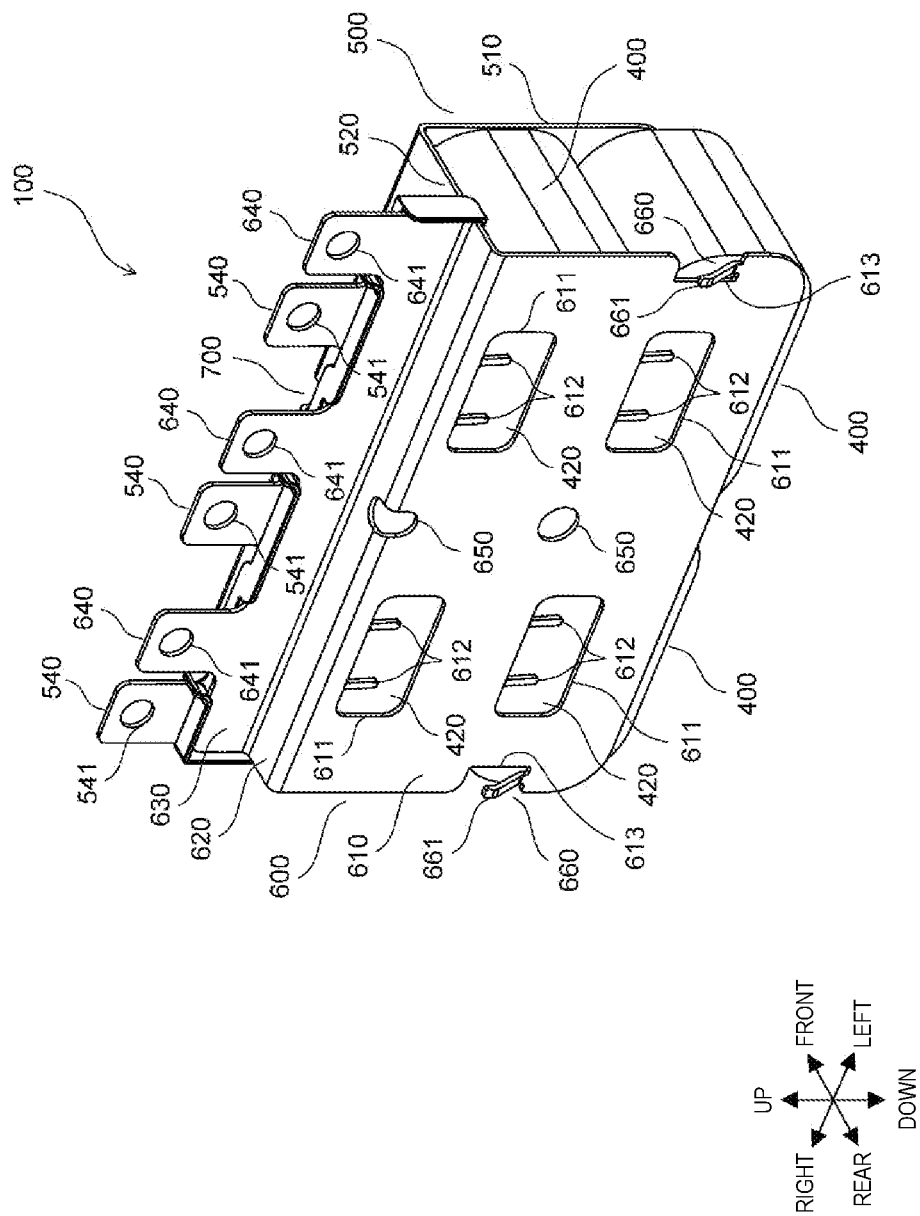
FIG. 3 is a perspective view illustrating the capacitor element unit according to the exemplary embodiment as viewed from rear and above, with the insulating sheet not attached.

FIG. 2 is a perspective view illustrating capacitor element unit 100 as viewed from in front and above, also illustrating insulating sheet 800 to be attached. FIG. 3 is a perspective view illustrating capacitor element unit 100 as viewed from rear and above, with insulating sheet 800 not attached.

Capacitor element unit 100 includes four capacitor elements 400, first bus bar 500, second bus bar 600, insulating plate 700, and insulating sheet 800.

Each of capacitor elements 400 is formed by laminating two metallized films each having vapor-deposited aluminum disposed on a dielectric film. Subsequently, the laminated metallized films are wound into a winding or stacked, and then flattened by pressing. Each capacitor element 400 includes first end-face electrode 410 at one end face, and second end-face electrode 420 at another end face. First end-face electrode 410 is formed by spraying a metal such as zinc, and second end-face electrode 420 is also formed by spraying a metal such as zinc. Four capacitor elements 400 are arranged in two rows with two capacitor elements 400 disposed in each of the two rows in a state that both end faces of each of four capacitor elements 400 face in front-rear direction. These capacitor elements 400 are connected to first bus bar 500 and second bus bar 600 in this arrangement.

Each capacitor element 400 according to the present exemplary embodiment is formed with the metallized films that each have the vapor-deposited aluminum on the dielectric film. Meanwhile, each capacitor element 400 may be formed with metallized films each having another vapor-deposited metal such as zinc or magnesium. Each capacitor element 400 may be formed with other alternatives including metallized films each having two or more of the above-mentioned metals vapor-deposited and metalized films each having a vapor-deposited alloy of these metals.

First bus bar 500 is formed by cutting out, from a conductive material such as a copper plate, an appropriate shape followed by bending. First bus bar 500 is, thus, a single structure including first electrode terminal 510, first relay portion 520, first overlapping portion 530, and first connection terminals 540.

First electrode terminal 510 substantially has the shape of a rectangular plate and covers first end-face electrode 410 of each capacitor element 400. First electrode terminal 510 includes two rectangular openings 511 that are arranged in left-right direction. A pair of connection pins 512 is formed at an upper edge of each of openings 511. Further, two pairs of connection pins 512 are formed at a lower edge of first electrode terminal 510 respectively on the right side and the left side thereof.

First relay portion 520 serves as a junction between first electrode terminal 510 and first overlapping portion 530. First relay portion 520 has the shape of an elongated rectangular plate and extends rearward from an upper edge of first electrode terminal 510. First overlapping portion 530 has the shape of an elongated rectangular plate and extends upward from a rear edge of first relay portion 520.

Three first connection terminals 540 are formed at predetermined intervals along an upper edge of first overlapping portion 530. Each of first connection terminals 540 has the shape of a rectangular plate and extends upward from the upper edge of first overlapping portion 530. Each of first connection terminals 540 has circular installation hole 541 in a leading end.

First bus bar 500 has a plurality of distribution holes 550 of appropriate shapes and sizes in appropriate positions.

Second bus bar 600 is formed by cutting out, from a conductive material such as a copper plate, an appropriate shape followed by bending. Second bus bar 600 is, thus, a single structure including second electrode terminal 610, second relay portion 620, second overlapping portion 630, and second connection terminals 640.

Second electrode terminal 610 substantially has the shape of a rectangular plate and covers second end-face electrode 420 of each capacitor element 400. Second electrode terminal 610 includes four rectangular openings 611 that are arranged in left-right direction and up-down direction. A pair of connection pins 612 is formed at an upper edge of each of openings 611.

Second relay portion 620 serves as a junction between second electrode terminal 610 and second overlapping portion 630. Second relay portion 620 has the shape of an elongated rectangular plate and extends forward from an upper edge of second electrode terminal 610. Second overlapping portion 630 has the shape of an elongated rectangular plate and extends upward from a front edge of second relay portion 620.

Three second connection terminals 640 are formed at predetermined intervals along an upper edge of second overlapping portion 630. Each of second connection terminals 640 has the shape of a rectangular plate and extends upward from the upper edge of second overlapping portion 630. Each of second connection terminals 640 has circular installation hole 641 in a leading end.

Second bus bar 600 has a plurality of distribution holes 650 of appropriate shapes and sizes in appropriate positions.

Second bus bar 600 also has notches 613 respectively in a left end and a right end of second electrode terminal 610. Flat spring 660 is formed at a lower edge of each of these notches 613. Each of flat springs 660 extends obliquely upward and rearward from the lower edge of notch 613, and bends so that leading end 661 rises straightly upward. Flat spring 660 has elasticity (springiness) in a front-rear direction and can be angled forward when leading end 661 is pushed forward.

Insulating plate 700 is made of a resin material that provides electrical insulation, such as acrylic or silicone. Insulating plate 700 has the shape of an elongated rectangle as with first overlapping portion 530 and second overlapping portion 630.

First bus bar 500 has the pairs of connection pins 512 of first electrode terminal 510 joined respectively to first end-face electrodes 410 of capacitor elements 400 by a method such as soldering, thus being electrically connected to first end-face electrodes 410. Second bus bar 600 has the pairs of connection pins 612 of second electrode terminal 610 joined respectively to second end-face electrodes 420 of capacitor elements 400 by a method such as soldering, thus being electrically connected to second end-face electrodes 420.

Second overlapping portion 630 of second bus bar 600 lies behind first overlapping portion 530 of first bus bar 500. With this configuration, capacitor element unit 100 is expected to reduce equivalent series inductance (ESL).

Insulating plate 700 is interposed between first overlapping portion 530 and second overlapping portion 630. In this way, first overlapping portion 530 and second overlapping portion 630 are electrically insulated from each other.

Insulating sheet 800 is substantially rectangular and is made of insulating paper or a resin material that provides electrical insulation, such as acrylic or silicone. As indicated by a dot-dash line in FIG. 2, insulating sheet 800 is attached to first electrode terminal 510 of first bus bar 500 by using a double-sided adhesive tape, an adhesive, or the like. Insulating sheet 800 covers first electrode terminal 510 and first end-face electrodes 410 of four capacitor elements 400.

Figure 4A:
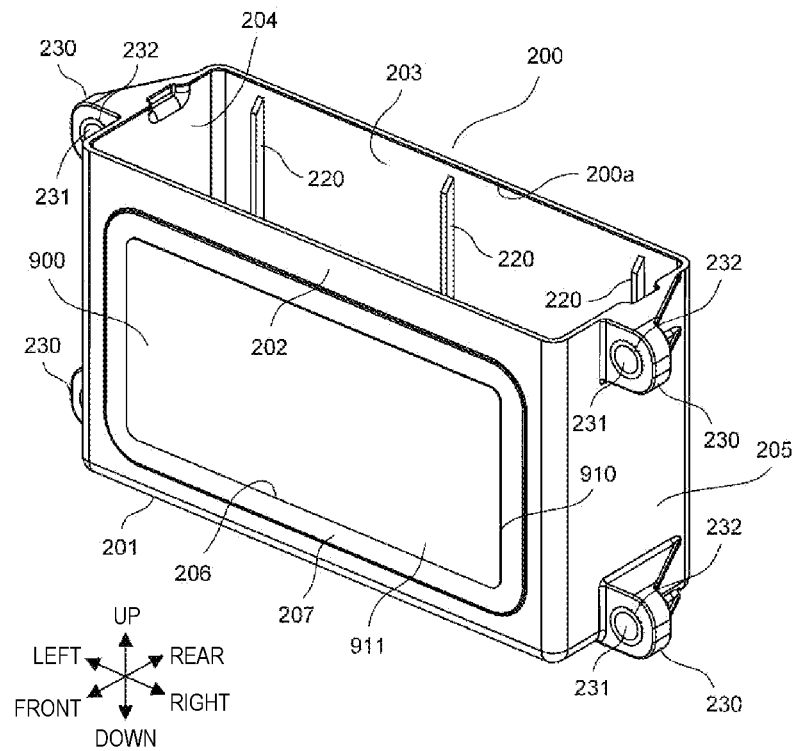
FIG. 4A is a perspective view illustrating a case according to the exemplary embodiment.
Figure 4B:
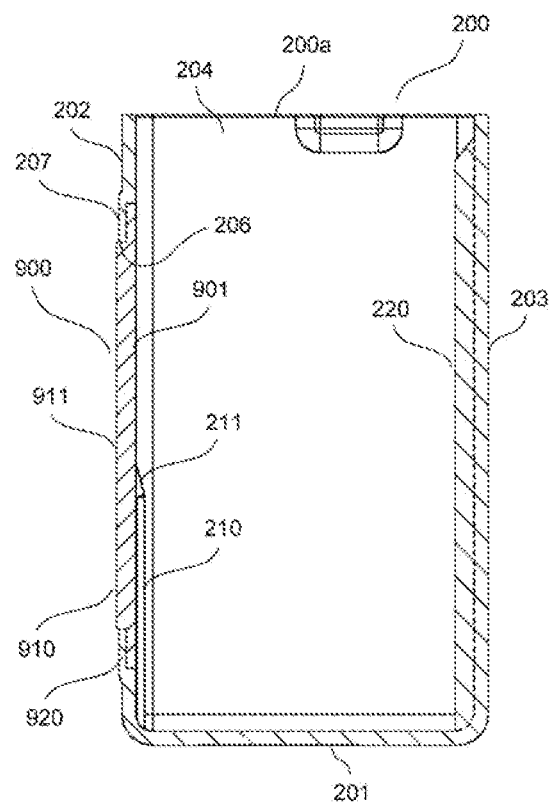
FIG. 4B is a cross-sectional side view illustrating the case according to the exemplary embodiment, the cross section being taken along a midline of the case.
Figure 5A:
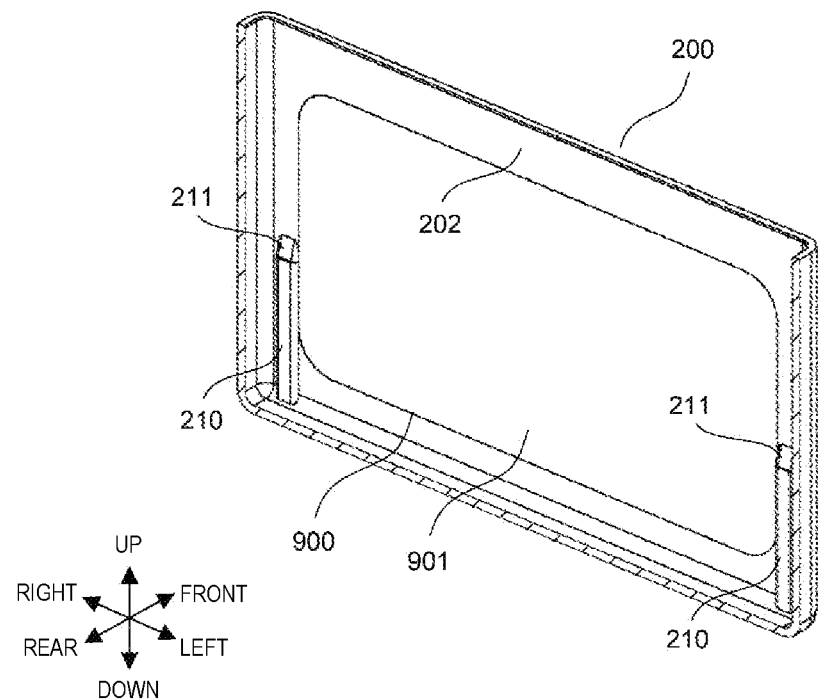
FIG. 5A illustrates a section of the case according to the exemplary embodiment as viewed in perspective from rear, the section being taken along a longitudinal line near a front face part.
Figure 5B:
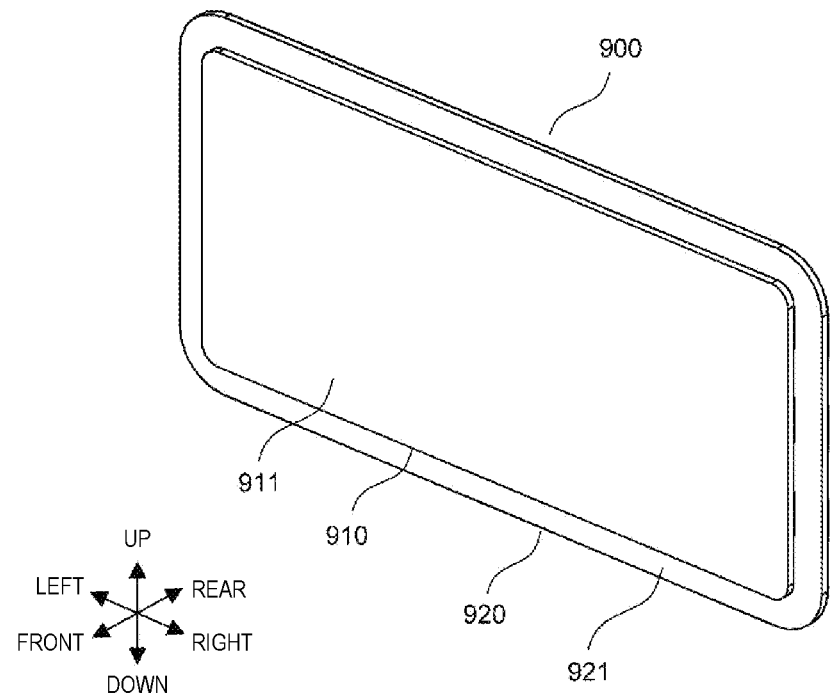
FIG. 5B is a perspective view illustrating a metal plate according to the exemplary embodiment.

FIG. 4A is a perspective view illustrating case 200, and FIG. 4B is a cross-sectional side view illustrating case 200 taken along a midline of case 200. FIG. 5A illustrates a section of case 200 as viewed in perspective from rear, the section being taken along a longitudinal line near front face part 202. FIG. 5B is a perspective view illustrating metal plate 900.

Case 200 is made of a resin such as polyphenylene sulfide (PPS), which is a thermoplastic resin. Case 200 is substantially a box of rectangular-parallelepiped shape and includes bottom face part 201 as well as front face part 202, rear face part 203, left face part 204, and right face part 205 that rise from bottom face part 201. Case 200 is opened at the top. Case 200 has a greater dimension in left-right direction than in up-down direction, and its left-right dimension and up-down dimension are each greater than a dimension in front-rear direction. Thus, each of front face part 202 and rear face part 203 has largest area, followed by bottom face part 201, and each of left face part 204 and right face part 205. Each of left face part 204 and right face part 205 has a smallest area.

Metal plate 900 is insert molded in front face part 202 of case 200. Metal plate 900 is, for example, a plate made with aluminum and has a much higher thermal conductivity than case 200, which is made with the resin. Metal plate 900 is substantially of rectangular and planar shape, resembling front face part 202. Metal plate 900 is roundedly chamfered at corners. When viewed from front, metal plate 900 occupies half or more of the area of front face part 202.

Metal plate 900 includes main plate portion 910 that is substantially rectangular and covered portion 920 that surrounds main plate portion 910 along an entire perimeter of main plate portion 910 (refer to FIG. 5B). Main plate portion 910 has a greater thickness than covered portion 920 and has front surface (i.e., outer surface) 911 protrudes forward from front surface (i.e., outer surface) 921 of covered portion 920, that is to say, protrudes in a direction outward of case 200.

In a state that metal plate 900 is insert molded in front face part 202, main plate portion 910 has its front surface 911 exposed outwardly of case 200 in opening 206 that is formed in front face part 202 as a result of the insert molding of metal plate 900, while covered portion 920 is covered at its outer side by peripheral portion 207 of front face part 202 which is disposed around opening 206. In order to secure a thickness of peripheral portion 207, peripheral portion 207 has a surface that slightly protrudes forward compared with its surrounding surface. Front surface 911 of main plate portion 910 slightly protrudes outward compared with the surface of peripheral portion 207 of case 200, that is to say, an outer surface of front face part 202. Outwardly protrusive front surface 911 of main plate portion 910 has a smaller area than front face part 202.

In a state that metal plate 900 is insert molded in front face part 202, rear surface (i.e., inner surface) 901 of metal plate 900 is exposed to an inside of case 200. Rear surface 901 of metal plate 900 is flush with an inner surface of front face part 202.

The inner surface of front face part 202 includes two elongated projections 210 each extending in up-down direction along metal plate 900 (refer to FIG. 5A). Two elongated projections 210 are respectively disposed on the left side and the right side of the inner surface of front face part 202. A rear surface of an upper end of each of elongated projections 210 has inclined surface 211 that is inclined to get closer to the inner surface of front face part 202 as heading upward.

Rear face part 203 of case 200 includes, at an inner surface, three ribs 220 each extending in up-down direction. Three ribs 220 are arranged in left-right direction at predetermined intervals. Rear face part 203 is reinforced with these ribs 220 and thus does not easily warp forward and rearward.

Each of left face part 204 and right face part 205 of case 200 includes installation tabs 230 respectively at an upper end and a lower end of its outer surface. Each of installation tabs 230 has insertion hole 231. Metal collar 232 is fitted into each insertion hole 231 for increasing hole strength. When film capacitor 1 is installed on an installation part of an external apparatus or any other apparatus, these installation tabs 230 are each fixed to the installation part by a screw or the like.

Figure 6A:
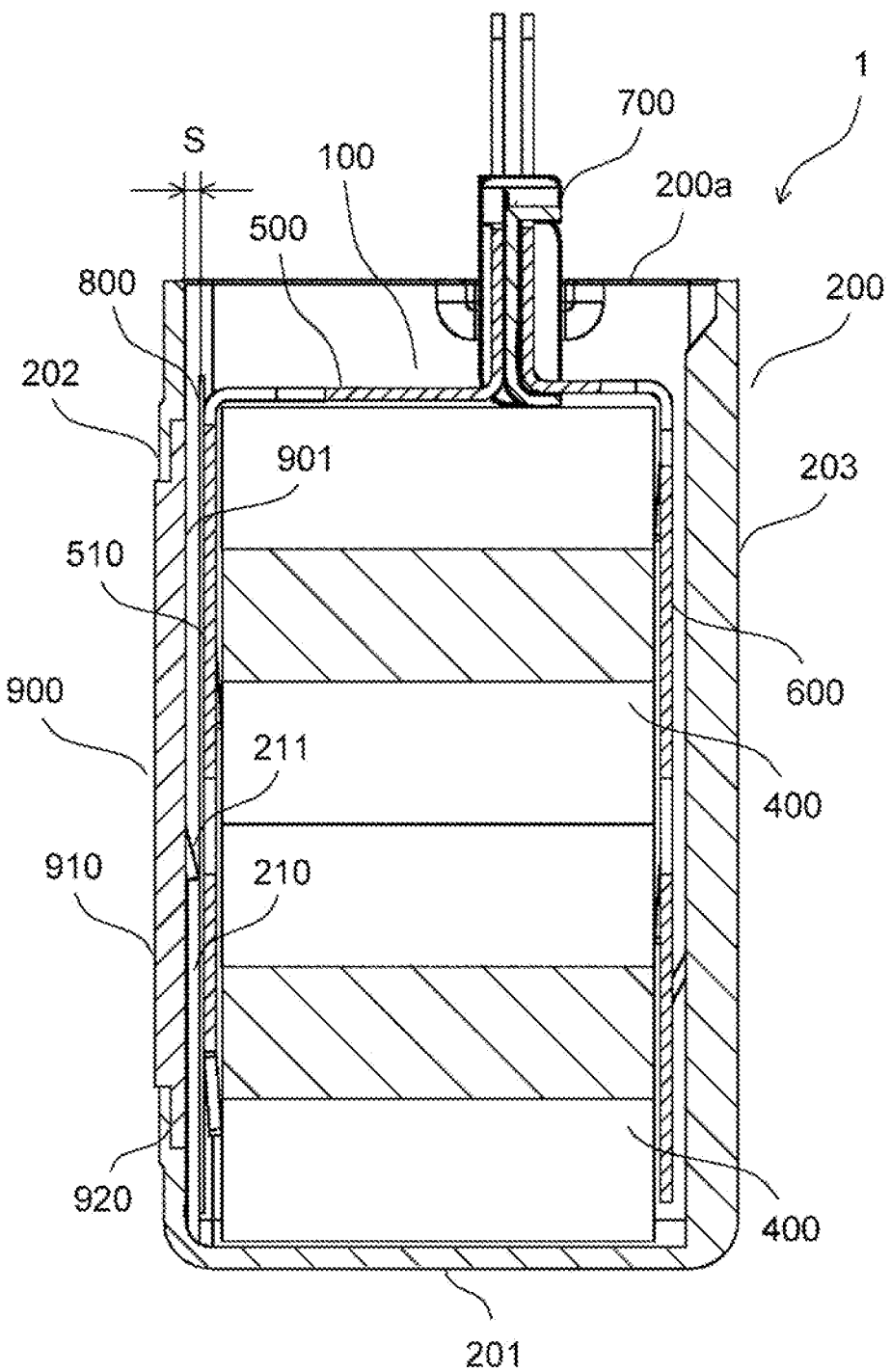
FIG. 6A is a cross-sectional side view illustrating the film capacitor according to the exemplary embodiment, in a state that the capacitor element unit is housed in the case.
Figure 6B:
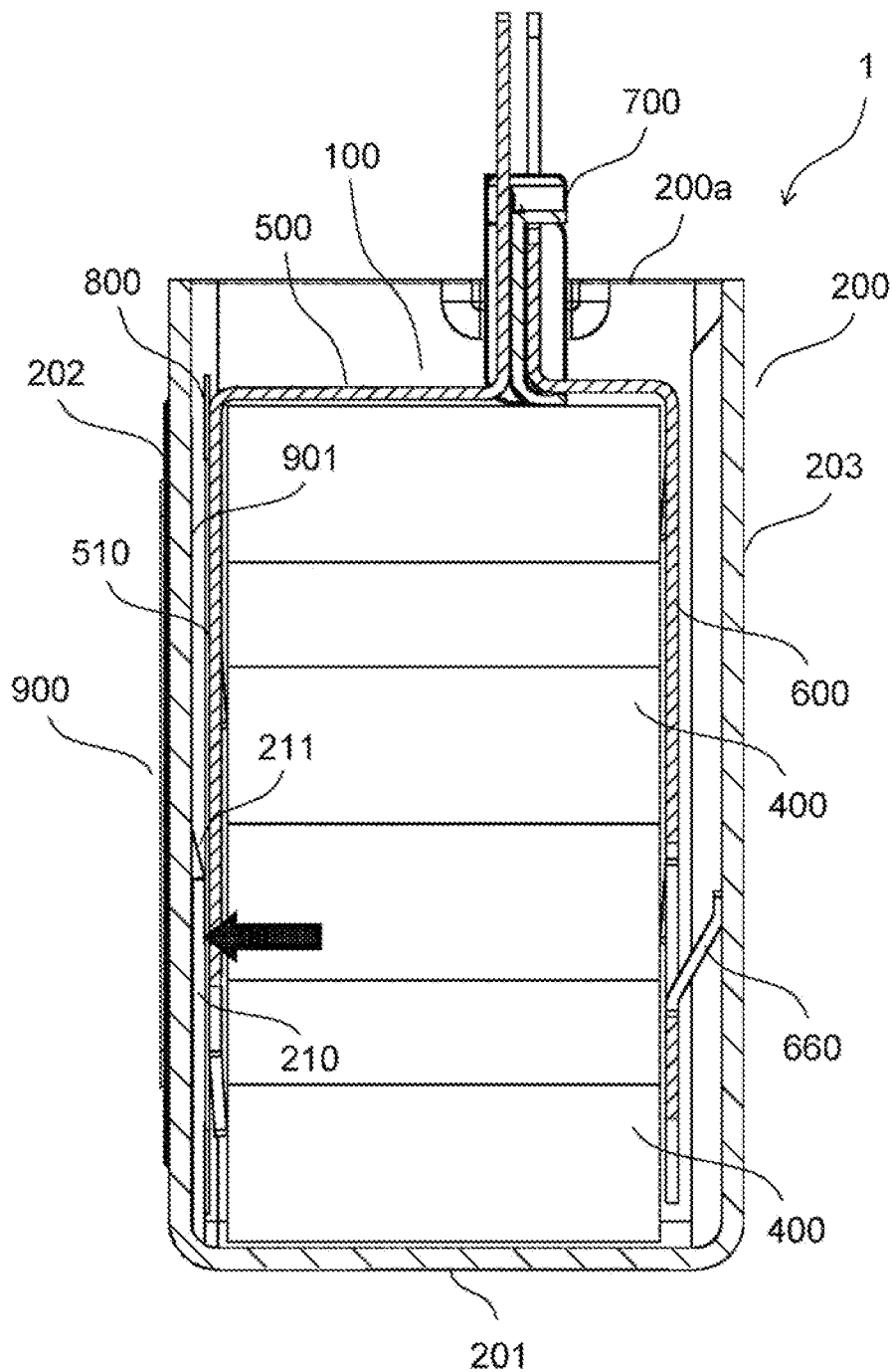
FIG. 6B is a cross-sectional side view illustrating the film capacitor according to the exemplary embodiment, in a state that the capacitor element unit is housed in the case.

FIGS. 6A and 6B are cross-sectional side views of film capacitor 1, illustrating capacitor element unit 100 housed in case 200. FIG. 6A illustrates the cross section taken along a midline of film capacitor 1, and FIG. 6B illustrates the cross section taken along a line across a left end of film capacitor 1.

Capacitor element unit 100 is inserted into case 200 through top opening 200a of case 200. Inside case 200, a size between elongated projections 210 and the inner surface of rear face part 203 is smaller than a size in the front-rear direction of capacitor element unit 100 including with flat springs 660. Thus, capacitor element unit 100 is inserted into a space between elongated projections 210 and rear face part 203 while letting flat springs 660 of capacitor element unit 100 be angled forward. During the insertion, a front surface of a lower part of capacitor element unit 100 comes into contact with inclined surface 211 of the upper end of each elongated projection 210. Thus, capacitor element unit 100 is guided rearward by inclined surface 211 along with the insertion, so that capacitor element unit 100 is smoothly inserted.

As illustrated in FIG. 6A, when capacitor element unit 100 has been inserted into case 200, capacitor element unit 100 contacts elongated projections 210 at a front. Thus, predetermined gap S for filling filler resin 300 is formed between rear surface 901 of metal plate 900 and capacitor element unit 100. Capacitor element unit 100 is pressed toward metal plate 900 as indicated by an arrow in FIG. 6B due to the elasticity of each flat spring 660 that has been angled and thus makes firm contact with elongated projections 210. This makes it easy for gap S between metal plate 900 and capacitor element unit 100 to remain unchanged.

Filler resin 300 in the liquid phase is injected into case 200 that houses capacitor element unit 100. Filler resin 300 passes through distribution holes 550 of first bus bar 500 and distribution holes 650 of second bus bar 600, thus easily reaching every one of four capacitor elements 400 between first bus bar 500 and second bus bar 600. Filler resin 300 is filled up to a vicinity of opening 200a of case 200. Following completion of the injection of filler resin 300, heating of case 200 is performed. Consequently, filler resin 300 in case 200 is cured.

Inside case 200, first electrode terminal 510 of first bus bar 500 of capacitor element unit 100 faces metal plate 900 via insulating sheet 800 and filler resin 300. Filler resin 300 and insulating sheet 800 ensure insulation between metal plate 900 and first bus bar 500 of capacitor element unit 100.

In this way, film capacitor 1 illustrated in FIG. 1 is completed.

Film capacitor 1 is installed in the external apparatus or any other apparatus. The external apparatus or any other apparatus has a pair of external terminals (not illustrated) for connection terminals 540, 640, and this pair of external terminals is connected to first connection terminals 540 and second connection terminals 640 with screws that are screwed into installation holes 541, 641, respectively.

Passage of current through capacitor elements 400 of film capacitor 1 can cause capacitor elements 400, first bus bar 500, and second bus bar 600 of capacitor element unit 100 to generate heat. The heat from capacitor element unit 100 is dissipated out through filler resin 300 and case 200. Since metal plate 900, which has the higher thermal conductivity, is insert molded in front face part 202 of case 200, the heat from capacitor element unit 100 is dissipated well through metal plate 900. As a whole, this can improve heat dissipation from case 200.

When film capacitor 1 is installed in the external apparatus, a prepared cooling unit (not illustrated) of the external apparatus can be attached to front surface 911 of main plate portion 910 of metal plate 900. The cooling unit performs cooling (heat absorption), so that the heat dissipation from case 200 is further improved in this case.

A coefficient of thermal expansion of case 200 is greatly different from a coefficient of thermal expansion of metal plate 900. A coefficient of thermal expansion of filler resin 300 is also greatly different from the coefficient of thermal expansion of metal plate 900. When film capacitor 1 is exposed to a temperature change (which causes thermal shock or the like), the differential coefficients of thermal expansion result in differential degrees of shrinkage, and stress occurs at an interface between case 200 and metal plate 900 as well as at an interface between case 200 and filler resin 300 to cause separations. When this happens, adhesion between case 200 and metal plate 900 and adhesion between case 200 and filler resin 300 easily deteriorate. Thus, the separation of case 200 and metal plate 900 and the separation of case 200 and filler resin 300 would possibly occur when a strong external force is applied to case 200 due to, for example, considerable vibration of film capacitor 1.

In the present exemplary embodiment, since covered portion 920 is covered at the outer side by peripheral portion 207 which is disposed around opening 206 of case 200, metal plate 900 does not move outward even if the separation of case 200 and metal plate 900 and the separation of case 200 and filler resin 300 occur. Thus, metal plate 900 is prevented from separating outward from case 200.

If film capacitor 1 has a shorter gap (distance) between metal plate 900 and capacitor element unit 100, the insulation will be difficult to ensure. A longer gap will cause difficult heat transfer from capacitor element unit 100 to metal plate 900, thus resulting in deteriorated heat dissipation from metal plate 900.

According to the present exemplary embodiment, since front face part 202 that includes insert molded metal plate 900 is provided with elongated projections 210, capacitor element unit 100 contacting elongated projections 210 is pressed against elongated projections 210 by flat springs 660. This configuration easily maintains proper gap S between metal plate 900 and capacitor element unit 100, so that adequate heat dissipation can be secured while ensuring the insulation.

<Effects of Exemplary Embodiment>

As described above, the present exemplary embodiment has the following effects.

Film capacitor 1 includes case 200 that is made of the resin and houses capacitor elements 400, metal plate 900 insert molded in case 200, and filler resin 300 filled in case 200. Metal plate 900 includes main plate portion 910 and covered portion 920 along the perimeter of main plate portion 910. Main plate portion 910 has front surface (outer surface) 911 exposed outwardly from opening 206 of case 200. Covered portion 920 has the outer surface covered by peripheral portion 207 which is disposed around opening 206 of case 200.

According to this configuration, because of covered portion 920 covered at its outer side by peripheral portion 207, metal plate 900 does not move outward even if the separation of case 200 and metal plate 900 and the separation of case 200 and filler resin 300 occur as a result of the exposure of film capacitor 1 to the temperature change (thermal shock or the like). Thus, metal plate 900 is prevented from separating outward from case 200.

Front surface (outer surface) 911 of main plate portion 910 of metal plate 900 is outwardly protrudes from front surface (outer surface) 921 of covered portion 920 in a direction outward of case 200.

This configuration enables front surface 911 of main plate portion 910 to be closer to a part external to case 200 or to be outside case 200 as in the present exemplary embodiment. This allows heat transmitted to metal plate 900 to be more easily dissipated out. Thus, case 200 provides better heat dissipation. When front surface 911 of main plate portion 910 is flush with the outer surface of case 200 or outside case 200 as in the present exemplary embodiment, during the installation of film capacitor 1 in the external apparatus, the prepared cooling unit can be easily attached to front surface 911 of main plate portion 910 for facilitating cooling of film capacitor 1.

Metal plate 900 is insert molded in case 200 so that rear surface (inner surface) 901 of metal plate 900 is exposed to an inside of case 200.

This configuration facilitates heat transfer from capacitor element unit 100 to metal plate 900.

An area of front surface (outer surface) 911 of main plate portion 910 is smaller than an area of front face part 202 which includes insert molded metal plate 900.

This configuration prevents metal plate 900 from sticking out of front face part 202 in in-plane direction of the outer surface of front face part 202. In the meantime, a size of film capacitor 1 is suppressed to becoming large.

Metal plate 900 of film capacitor 1 faces first bus bar 500 of capacitor element unit 100.

This configuration enables heat generated by first bus bar 500 and heat transmitted from capacitor elements 400 to first bus bar 500 to be efficiently transmitted to metal plate 900.

Film capacitor 1 further includes elongated projections 210 that project along metal plate 900 from the inner surface of front face part 202 including insert molded metal plate 900, and contact capacitor element unit 100. Further, film capacitor 1 includes flat springs 660 that have the elasticities and press capacitor element unit 100 with their elasticities toward metal plate 900, namely, against elongated projections 210.

This configuration easily maintains proper gap S between metal plate 900 and capacitor element unit 100, so that the adequate heat dissipation can be secured while ensuring the insulation.

The above-described exemplary embodiment according to the present disclosure is not restrictive of the present disclosure. Application examples of the present disclosure may include various modifications other than the above exemplary embodiment.

For example, metal plate 900 is insert molded in front face part 202 of case 200 in the present exemplary embodiment. Meanwhile, the above configuration is not limiting. Metal plate 900 may be insert molded in bottom face part 201, rear face part 203, left face part 204, or right face part 205 of case 200. When metal plate 900 is insert molded in rear face part 203, second electrode terminal 610 of second bus bar 600 faces metal plate 900. Insert molding metal plate 900 in either of front face part 202 and rear face part 203 that are largest in area enables metal plate 900 to be larger in size. Thus, improvement of the heat dissipation of case 200 can be facilitated. Insert molding metal plate 900 may be done in a plurality of face parts including front face part 202 and rear face part 203, instead of the single face part of case 200. A plurality of metal plates 900 may be insert molded in the single face part in an appropriate arrangement.

Figure 7A:
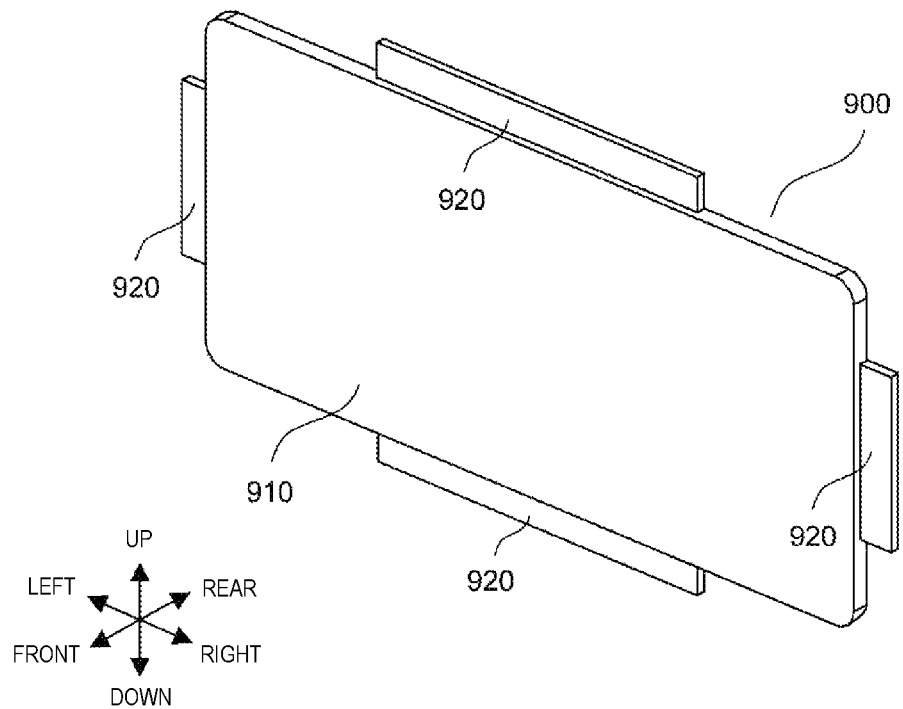
FIG. 7A is a perspective view illustrating a metal plate according to one variation of the exemplary embodiment.
Figure 7B:
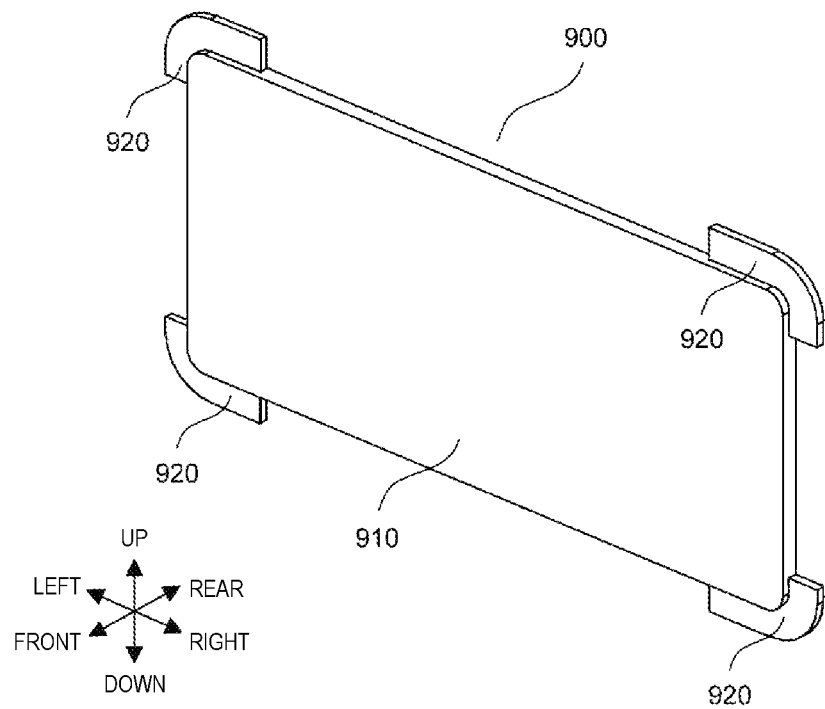
FIG. 7B is a perspective view illustrating a metal plate according to another variation of the exemplary embodiment.

In the above exemplary embodiment, covered portion 920 of metal plate 900 surrounds main plate portion 910 along the entire perimeter of main plate portion 910. Meanwhile, covered portion 920 may have any form provided that covered portion 920 is on the perimeter of main plate portion 910 and is covered at its outer side by peripheral portion 207 which is disposed around opening 206 of case 200. For example, as FIG. 7A illustrates, covered portions 920 may be respectively along respective portions of an upper edge, a lower edge, a left edge, and a right edge of main plate portion 910. As FIG. 7B illustrates, covered portions 920 may be respectively along four corner edges of main plate portion 910. Instead of being along the four portions, namely, the upper portion, the lower portion, the left portion, and the right portion as illustrated in FIG. 7A, covered portions 920 may be respectively along only two of the portions, namely, along the upper and lower portions or the left and right portions. Instead of being along the four corners as illustrated in FIG. 7B, covered portions 920 may be respectively along only two of the corners that are diagonally opposite.

Figure 8A:
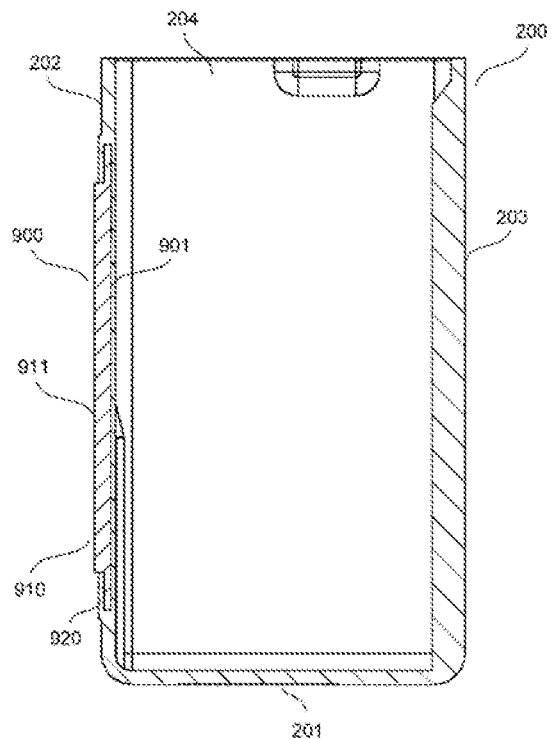
FIG. 8A is a cross-sectional side view illustrating a case according to one modification of the exemplary embodiment, the cross section being taken along a midline of the case.

In the above exemplary embodiment, metal plate 900 is insert molded in case 200 (front face part 202) so that its rear surface (inner surface) 901 is exposed inside case 200. Meanwhile, metal plate 900 may be insert molded in case 200 so that at least front surface (outer surface) 911 of main plate portion 910 is exposed outwardly of case 200. That is, metal plate 900 may be insert molded in case 200 so that its rear surface 901 is not exposed inside case 200 as illustrated in FIG. 8A.

In the above exemplary embodiment, metal plate 900 is insert molded in case 200 so that front surface 911 of main plate portion 910 is slightly protrusive outwardly compared with the outer surface of case 200 (front face part 202), that is to say, the surface of peripheral portion 207. Meanwhile, metal plate 900 may be insert molded in case 200 so that front surface 911 of main plate portion 910 is flush with the outer surface of case 200 or set back or inward from the outer surface of case 200. When set back or inward from the outer surface of case 200, front surface 911 of main plate portion 910 may be flush with front surface 921 of covered portion 920.

Figure 8B:
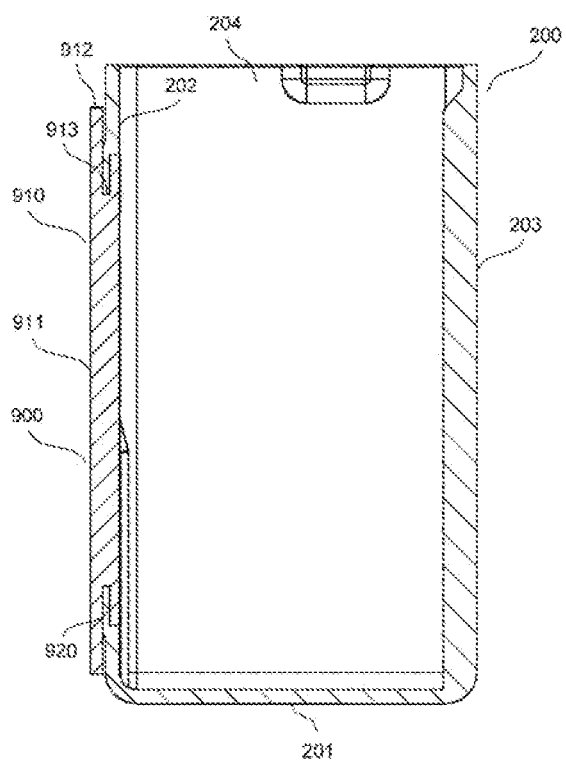
FIG. 8B is a cross-sectional side view illustrating a case according to another modification of the exemplary embodiment, the cross section being taken along a midline of the case.

As FIG. 8B illustrates, in order to have its front surface 911 protrusive outwardly compared with the outer surface of case 200, main plate portion 910 may include protrusive portion 912 that is larger in size than its non-protrusive portion 913. For the purpose of preventing film capacitor 1 from becoming larger in size, front surface 911 of main plate portion 910, which is front surface 911 of protrusive portion 912, preferably has a smaller area than front face part 202 in this case so that front surface 911 of main plate portion 910 does not protrude from front face part 202 in left-right direction and up-down direction. Meanwhile, if heat dissipation is considered more important than the increasing size of film capacitor 1, front surface 911 of protrusive portion 912 may have a larger area than front face part 202.

In the above exemplary embodiment, front face part 202 of case 200 includes elongated projections 210 on the inner surface. Meanwhile, capacitor element unit 100 may include elongated projections that contact the inner surface of front face part 202, for example, on first bus bar 500. Case 200 or capacitor element unit 100 may include a projection that is different in shape from elongated projection 210 provided that capacitor element unit 100 forms a gap with metal plate 900.

In the above exemplary embodiment, capacitor element unit 100 is pressed toward metal plate 900 by flat springs 660 that capacitor element unit 100 itself has. Meanwhile, such a pressing portion may be any other structure having elasticity to press capacitor element unit 100 or does not have to be included in capacitor element unit 100.

In the above exemplary embodiment, capacitor element unit 100 includes insulating sheet 800. Meanwhile, when insulation is securable with only filler resin 300, insulating sheet 800 may be omitted from capacitor element unit 100.

The shapes of case 200 and metal plate 900 that are described in the above exemplary embodiment are not limiting. Case 200 and metal plate 900 may have shapes different from those in the above exemplary embodiment.

In the above exemplary embodiment, film capacitor 1 includes four capacitor elements 400. Meanwhile, an appropriately modified number of capacitor elements 400 is possible, including one.

In the above exemplary embodiment, each capacitor element 400 is formed with the two metallized films each having the vapor-deposited aluminum on the dielectric film, and the metallized films are layered and are wound into the winding or stacked as the multiple single layers. Alternatively, each capacitor element 400 may be formed with an insulating film and a metallized film having vapor-deposited aluminum on both sides of a dielectric film, and in this case, the metallized film and the insulating film are layered and are wound into a winding or stacked as multiple single layers.

In the above exemplary embodiment, film capacitor 1 is given as an example of the capacitor according to the present disclosure. Meanwhile, the present disclosure is also applicable to capacitors other than film capacitor 1.

In addition, the exemplary embodiment according to the present disclosure allows of various modifications as appropriate within the scope of the technical concept as claimed.

In the description of the above exemplary embodiment, the terms that indicate the directions, such as "upward" and "lower", describe relative directions based only on relative positions of the constituent elements and not absolute directions like a perpendicular direction and a horizontal direction.

The present disclosure is useful in providing capacitors that are used in various electronic devices, electrical devices, industrial apparatuses, and electrical devices for vehicles, among others.

What is claimed is:

1. A capacitor comprising:
    a capacitor element;
    a case housing the capacitor element, the case containing a resin;
    a metal plate insert molded in the case; and
    a filler resin filled in the case, wherein:
    the metal plate includes a main plate portion and a covered portion disposed along a perimeter of the main plate portion,
    the main plate portion has an outer surface exposed outwardly from an opening of the case, and
    the covered portion has an outer surface covered by a peripheral portion of the case, the peripheral portion being disposed around the opening.

2. The capacitor according to claim 1, wherein the outer surface of the main plate portion protrudes from the outer surface of the covered portion in a direction outward of the case.

3. The capacitor according to claim 1, wherein the metal plate is insert molded in the case so that an inner surface of the metal plate is exposed to an inside of the case.

4. The capacitor according to claim 1, wherein:
    the case includes a bottom face part and four side face parts each rising from the bottom face part, and
    the metal plate is insert molded in one face part among the bottom face part and the four side face parts.

5. The capacitor according to claim 4, wherein an area of the outer surface of the main plate portion is smaller than an area of the one face part in which the metal plate is insert molded.

6. The capacitor according to claim 4, further comprising a bus bar connected to an electrode of the capacitor element, wherein the metal plate faces the bus bar.

7. The capacitor according to claim 4, further comprising:
    a bus bar connected to an electrode of the capacitor element, the bus bar and the capacitor element constitutes a capacitor element unit;
    a projection that projects from a position in an inner surface of the one face part in which the metal plate is insert molded and contacts the capacitor element unit, the position being disposed in a periphery of the metal plate; and
    a pressing portion that has elasticity and presses the capacitor element unit toward the metal plate.

8. The capacitor according to claim 4, further comprising:
    a bus bar connected to an electrode of the capacitor element, the bus bar and the capacitor element constitutes a capacitor element unit;
    a projection that projects from the capacitor element unit and contacts a position in an inner surface of the one face part in which the metal plate is insert molded, the position being disposed in a periphery of the metal plate; and
    a pressing portion that has elasticity and presses the capacitor element unit toward the metal plate.

* * * * *